United States Patent
Chang et al.

(10) Patent No.: US 11,737,141 B2
(45) Date of Patent: Aug. 22, 2023

(54) METHOD AND APPARATUS OF SETTING PROTECTION FRAMES FOR PROTECTING TRANSMISSION OF PREAMBLE PUNCTURED PHYSICAL LAYER PROTOCOL DATA UNIT

(71) Applicant: MEDIATEK INC., Hsin-Chu (TW)

(72) Inventors: Cheng-Yi Chang, Hsinchu (TW);
Chao-Wen Chou, Hsinchu (TW);
Kun-Sheng Huang, Hsinchu (TW);
Chin-Chi Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 39 days.

(21) Appl. No.: 17/353,760

(22) Filed: Jun. 21, 2021

(65) Prior Publication Data
US 2021/0400728 A1  Dec. 23, 2021

Related U.S. Application Data

(60) Provisional application No. 63/042,609, filed on Jun. 23, 2020.

(51) Int. Cl.
*H04W 74/08*  (2009.01)

(52) U.S. Cl.
CPC .............. *H04W 74/0816* (2013.01)

(58) Field of Classification Search
CPC .................................. H04W 74/0816
See application file for complete search history.

(56) References Cited

U.S. PATENT DOCUMENTS 11,382,101 B1 * 7/2022 Chu .................. H04L 5/0044
2018/0092127 A1 * 3/2018 Park ............... H04W 72/0453

* cited by examiner

*Primary Examiner* — James P Duffy
(74) *Attorney, Agent, or Firm* — Winston Hsu (57) ABSTRACT

One wireless communication device includes a transmitter circuit and a control circuit, wherein the control circuit sets a request to send (RTS) frame, and controls the transmitter circuit to transmit the RTS frame via at least one channel excluding a preamble punctured channel. Another wireless communication device includes a transmitter circuit and a control circuit, wherein the control circuit sets an RTS frame, and controls the transmitter circuit to transmit the RTS frame via a plurality of channels including the preamble punctured channel.

8 Claims, 8 Drawing Sheets

METHOD AND APPARATUS OF SETTING PROTECTION FRAMES FOR PROTECTING TRANSMISSION OF PREAMBLE PUNCTURED PHYSICAL LAYER PROTOCOL DATA UNIT

CROSS REFERENCE TO RELATED APPLICATIONS

This application claims the benefit of U.S. provisional application No. 63/042,609, filed on Jun. 23, 2020 and incorporated herein by reference.

BACKGROUND

The present invention relates to wireless communications, and more particularly, to a method and apparatus of setting protection frames for protecting transmission of a preamble punctured physical layer protocol data unit (PPDU).

For channel bonding, IEEE 802.11ac supports several bandwidth modes: 20/40/80/160 (80+80) megahertz (MHz). However, except for the 80+80 MHz mode, all other modes require the bonded channels to be continuous. Thus, larger channel bandwidth cannot be bonded when multiple idle channels are separated by the busy channel. Therefore, a preamble puncturing mechanism is introduced in IEEE 802.11ax, allowing channels to be bonded in a non-continuous way. This increases the available bandwidth, while improving the transmission rate. For example, an access point (AP) is allowed to transmit a high efficiency (HE) PPDU in punctured 80 or 160 (80+80) MHz format when part of the 20 MHz sub-channel(s) in secondary channels of the channel bandwidth is (are) busy. Preamble puncturing is an optional feature for both the AP and STA sides. In the preamble puncturing mode, the preamble part will be punctured, which means it will not be transmitted, in the busy 20 MHz channel (which is also called preamble punctured channel). However, IEEE 802.11ax specification only addresses preamble puncturing for HE PPDU only. Non-HT (high throughput) PPDU is out-of-scope.

SUMMARY

One of the objectives of the claimed invention is to provide a method and apparatus of setting protection frames for protecting transmission of a preamble punctured physical layer protocol data unit (PPDU). For example, the protection frames may include a request to send (RTS) frame and a clear to send (CTS) frame.

According to a first aspect of the present invention, an exemplary wireless communication device is disclosed. The exemplary wireless communication device includes a transmitter circuit and a control circuit. The control circuit is arranged to set a request to send (RTS) frame, and control the transmitter circuit to transmit the RTS frame via at least one channel excluding a preamble punctured channel.

According to a second aspect of the present invention, an exemplary wireless communication method is disclosed. The exemplary wireless communication method includes: setting a request to send (RTS) frame; and transmitting, by a transmitter circuit, the RTS frame via at least one channel excluding a preamble punctured channel.

According to a third aspect of the present invention, an exemplary wireless communication device is disclosed. The exemplary wireless communication device includes a transmitter circuit and a control circuit. The control circuit is arranged to set a request to send (RTS) frame, and control the transmitter circuit to transmit the RTS frame via a plurality of channels including a preamble punctured channel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
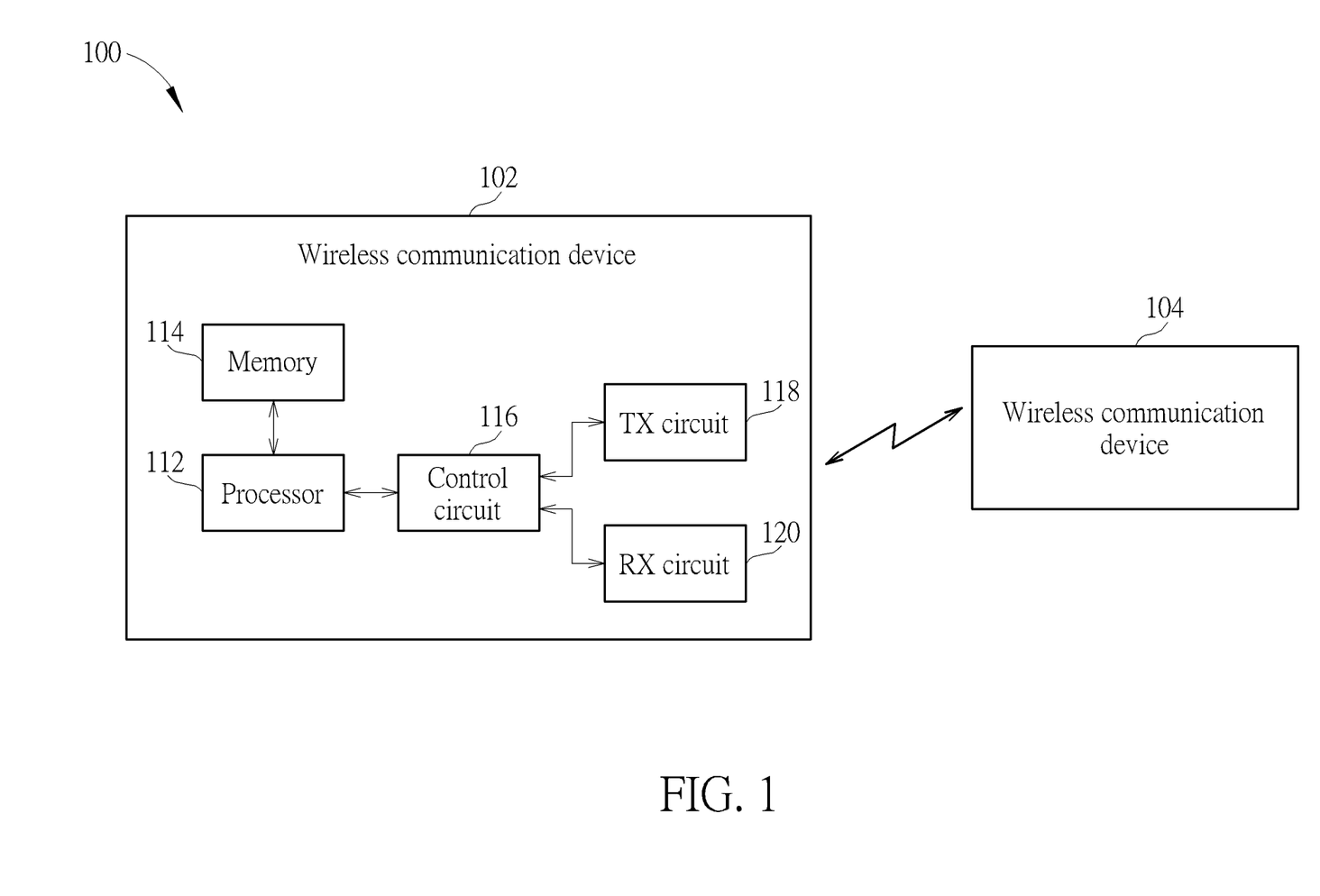
FIG. 1 is a diagram illustrating a wireless fidelity (WiFi) communication system according to an embodiment of the present invention.

FIG. 1 is a diagram illustrating a wireless fidelity (WiFi) communication system according to an embodiment of the present invention. The WiFi communication system 100 has a plurality of wireless communication devices 102 and 104, including an access point (AP) and a non-AP station. For example, the wireless communication device 102 may be an AP, and the wireless communication device 104 may be a non-AP station (STA). For another example, the wireless communication device 102 may be a non-AP STA, and the wireless communication device 104 may be an AP. For brevity and simplicity, only two wireless communication devices are shown in FIG. 1. In practice, the WiFi communication system 100 is allowed to have more than two wireless communication devices, including an AP and more than one non-AP STA in the same basic service set (BSS). By way of example, but not limitation, both of wireless communication devices 102 and 104 may be in compliance with IEEE 802.11ax and/or IEEE 802.11be standard.

As shown in FIG. 1, the wireless communication device 102 includes a processor 112, a memory 114, a control circuit 116, a transmitter (TX) circuit 118, and a receiver (RX) circuit 120. The memory 114 is arranged to store a program code. The processor 112 is arranged to load and execute the program code to manage the wireless communication device 102. The control circuit 116 is arranged to control wireless communications with the wireless communication device 104. In a case where the wireless communication device 102 is an AP and the wireless communication device 104 is a non-AP STA, the control circuit 116 controls the TX circuit 118 to deal with downlink (DL) traffic between AP and non-AP STA, and controls the RX circuit 120 to deal with uplink (UL) traffic between AP and non-AP STA. In another case where the wireless communication device 102 is a non-AP STA and the wireless communication device 104 is an AP, the control circuit 116 controls the TX circuit 118 to deal with UL traffic between non-AP and AP, and controls the RX circuit 120 to deal with DL traffic between non-AP STA and AP.

In a wireless network, there is a large number of mobile nodes that share the communication medium. The wireless network employs carrier sensing based algorithms such as Carrier Sensing Multiple Access (CSMA) and CSMA with Collision Avoidance (CSMA/CA) for efficient sharing of communication channel. But this method does not solve the problem of hidden nodes. Hidden nodes are those nodes that are out of range of other nodes or a group of nodes. The network throughput reduces because of packet collisions caused by these hidden nodes. To solve hidden node problem, a request to send (RTS) and clear to send (CTS) mechanism is widely used in wireless networks for reserving the channel to transmit data from a sender to a receiver. For example, the sender sends an RTS frame with a network allocation vector (NAV) setting to a receiver, and the receiver responds with a CTS frame having an updated NAV setting. All neighboring STAs on the same channel will hear RTS, CTS, or both, and will update their NAV timers and defer their own transmissions on the channel.

In order to increase channel utilization, the wireless communication device 102 may transmit an HE PPDU in a punctured 80 or 160 (80+80) MHz format when a part of the channel bandwidth is busy. In one embodiment of the present invention, the preamble punctured HE PPDU may be an HE single-user (SU) PPDU. In another embodiment, the preamble punctured HE PPDU may be an HE multi-user (MU) PPDU. The present invention proposes several RTS/CTS schemes to protect transmission of the preamble punctured HE PPDU.

Figure 2:
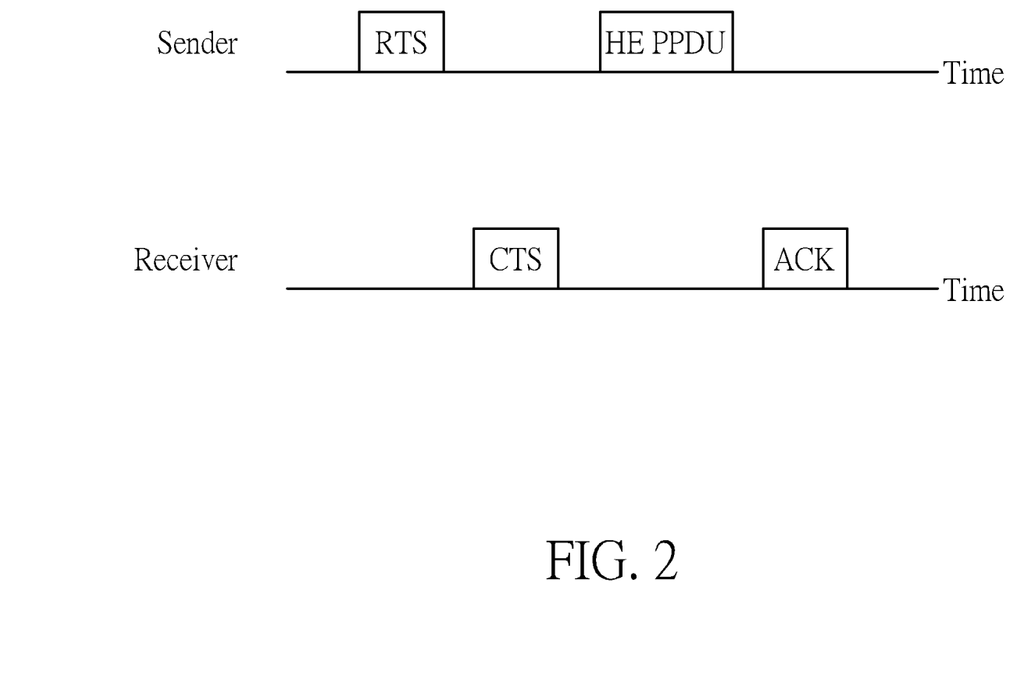
FIG. 2 is a diagram illustrating wireless communications between wireless communication devices shown in FIG. 1 according to an embodiment of the present invention.

FIG. 2 is a diagram illustrating wireless communications between wireless communication devices 102 and 104 shown in FIG. 1 according to an embodiment of the present invention. The wireless communication device 102 may send an RTS frame to the wireless communication device 104. After receiving the RTS frame, the wireless communication device 104 responds with a CTS frame. After receiving the CTS frame, the wireless communication device 102 transmits an HE PPDU with preamble puncturing to the wireless communication device 104. After successfully receiving the preamble punctured HE PPDU, the wireless communication device 104 sends an acknowledgement (ACK) frame to the wireless communication device 102. In a case where the wireless communication device 102 is an AP, the RTS frame may be a multi-user request to send (MU-RTS) frame, and the preamble punctured HE PPDU may be a preamble punctured HE MU PPDU. In contrast to the conventional RTS/CTS design, the present invention proposes bandwidth adaptation and/or preamble puncturing for these protection frames.

Figure 3:
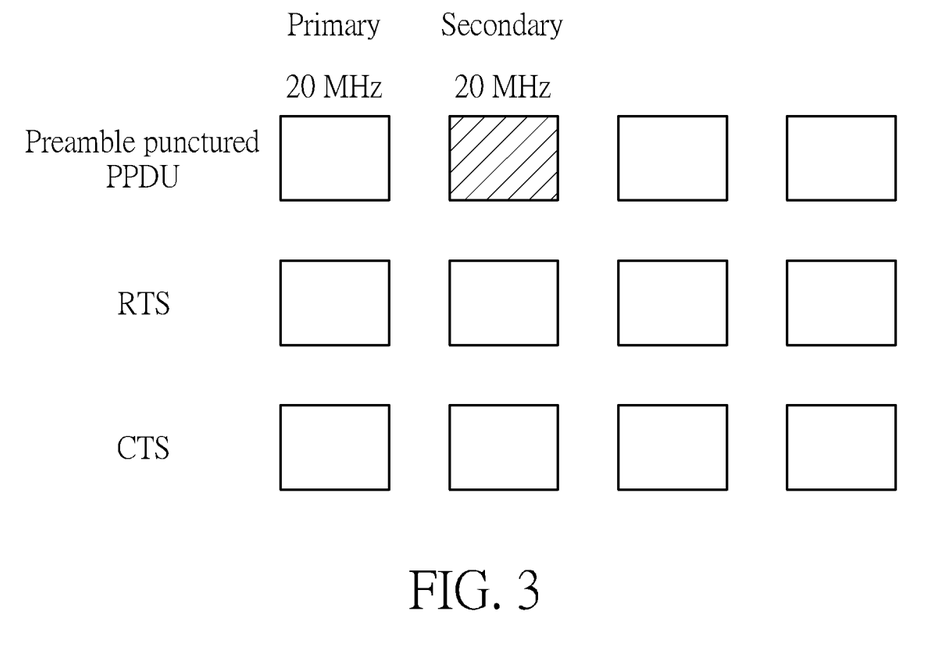
FIG. 3 is a diagram illustrating a first RTS/CTS scheme according to an embodiment of the present invention.

FIG. 3 is a diagram illustrating a first RTS/CTS scheme according to an embodiment of the present invention. Suppose that a preamble punctured PPDU will be transmitted in an 80 MHz channel bandwidth with preamble puncturing, including a primary 20 MHZ channel, a secondary 20 MHz channel that is preamble punctured, and a secondary 40 MHz channel consisting of two contiguous 20 MHz channels. The control circuit 116 is arranged to set an RTS frame, and control the TX circuit 118 to transmit the RTS frame via channels including a preamble punctured channel (e.g., secondary 20 MHz channel as shown in FIG. 3). More specifically, the channels on which the RTS frame is sent include the preamble punctured channel and all channels of the preamble punctured PPDU that are not preamble punctured. The wireless communication device 104 detects the non-punctured bandwidth pattern (i.e., non-punctured resource unit (RU) allocation) of the RTS frame sent from the wireless communication device 102, and generates a CTS frame in response to the RTS frame, where the CTS frame has a non-punctured bandwidth pattern (i.e., non-punctured RU allocation) the same as that of the RTS frame. Hence, the RX circuit 120 receives the CTS frame transmitted via channels, including the preamble punctured channel and all channels of the preamble punctured PPDU that are not preamble punctured. However, if the RTS frame is an MU-RTS frame, the CTS bandwidth can be specified in the MU-RTS frame. To put it simply, the first RTS/CTS scheme employs an RTS frame and a CTS frame each with a non-punctured bandwidth pattern (i.e., non-punctured RU allocation) to achieve protection of the full 80 MHz bandwidth which covers the preamble punctured channel.

Figure 4:
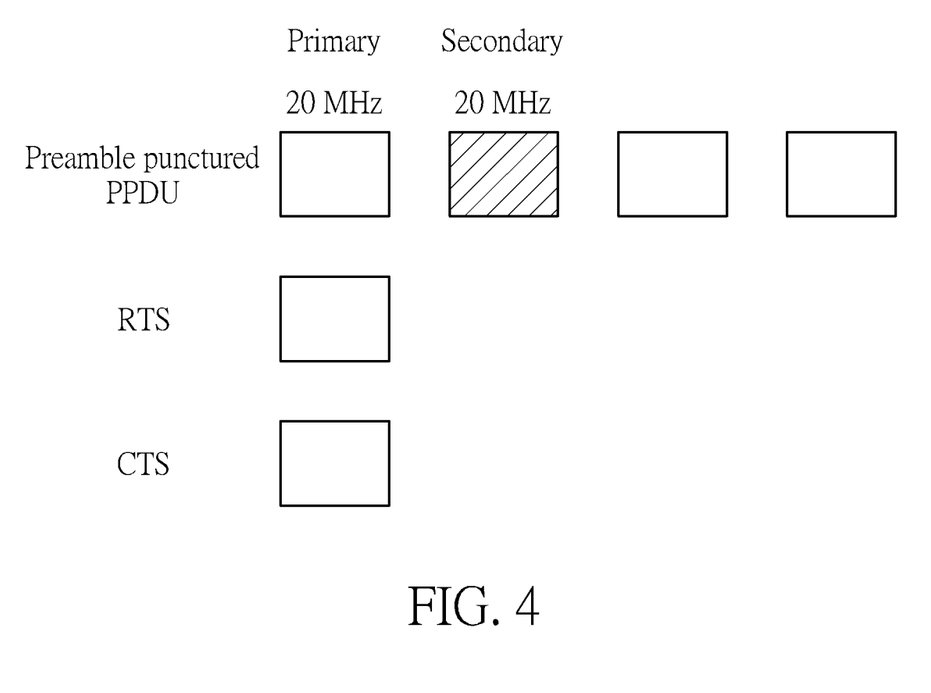
FIG. 4 is a diagram illustrating a second RTS/CTS scheme according to an embodiment of the present invention.

FIG. 4 is a diagram illustrating a second RTS/CTS scheme according to an embodiment of the present invention. Suppose that a preamble punctured PPDU will be transmitted in an 80 MHz channel bandwidth with preamble puncturing, including a primary 20 MHZ channel, a secondary 20 MHz channel that is preamble punctured, and a secondary 40 MHz channel consisting of two contiguous 20 MHz channels. The control circuit 116 is arranged to set an RTS frame, and control the TX circuit 118 to transmit the RTS frame via a primary channel (e.g., primary 20 MHz channel as shown in FIG. 4) only, where the primary channel is not a preamble punctured channel (e.g., secondary 20 MHz channel as shown in FIG. 4). The wireless communication device 104 detects the non-punctured bandwidth pattern (i.e., non-punctured RU allocation) of the RTS frame sent from the wireless communication device 102, and generates a CTS frame in response to the RTS frame, where the CTS frame has a non-punctured bandwidth pattern (i.e., non-punctured RU allocation) the same as that of the RTS frame. In this embodiment, the RX circuit 120 receives the CTS frame transmitted via the primary channel (e.g., primary 20 MHz channel shown in FIG. 4) only. However, if the RTS frame is an MU-RTS frame, the CTS bandwidth can be specified in the MU-RTS frame. To put it simply, the second RTS/CTS scheme employs an RTS frame on a primary channel only and a CTS frame on a primary channel only to achieve protection of a partial bandwidth that covers a primary channel (e.g., primary 20 MHz/40 MHz/80 MHz channel) only.

Figure 5:
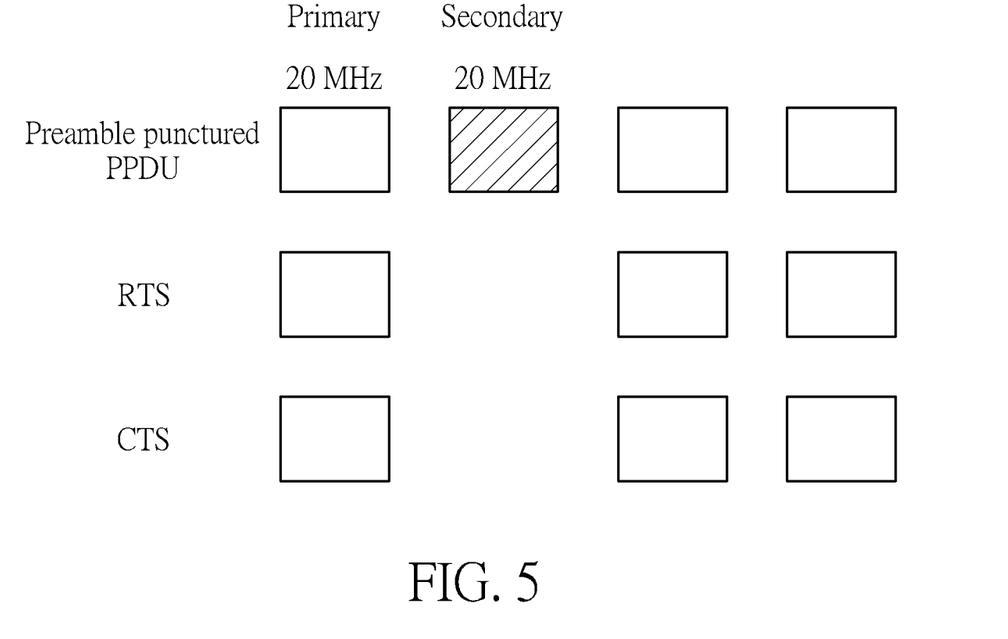
FIG. 5 is a diagram illustrating a third RTS/CTS scheme according to an embodiment of the present invention.

FIG. 5 is a diagram illustrating a third RTS/CTS scheme according to an embodiment of the present invention. Suppose that a preamble punctured PPDU will be transmitted in an 80 MHz channel with preamble puncturing, including a primary 20 MHZ channel, a secondary 20 MHz channel that is preamble punctured, and a secondary 40 MHz channel consisting of two contiguous 20 MHz channels. The control circuit 116 is arranged to set an RTS frame, and control the TX circuit 118 to transmit the RTS frame via channels excluding a preamble punctured channel (e.g., secondary 20 MHz channel as shown in FIG. 5). More specifically, the channels on which the RTS frame is sent include all channels of the preamble punctured PPDU that are not preamble punctured. In this embodiment, the wireless communication device 104 is equipped with the capability of detecting a punctured bandwidth pattern (i.e., punctured RU allocation) of the RTS frame sent from the wireless communication device 102. The wireless communication device 104 generates a CTS frame in response to the RTS frame, where the CTS frame has a punctured bandwidth pattern (i.e., punctured RU allocation) the same as that of the RTS frame. Hence, the RX circuit 120 receives the CTS frame transmitted via channels, excluding the preamble punctured channel and including all channels of the preamble punctured PPDU that are not preamble punctured. However, if the RTS frame is an MU-RTS frame, the CTS bandwidth can be specified in the MU-RTS frame. To put it simply, the third RTS/CTS scheme employs an RTS frame and a CTS frame each with a punctured bandwidth pattern (i.e., punctured RU allocation) to achieve protection of the bandwidth that is the same as that of the preamble punctured PPDU.

Figure 6:
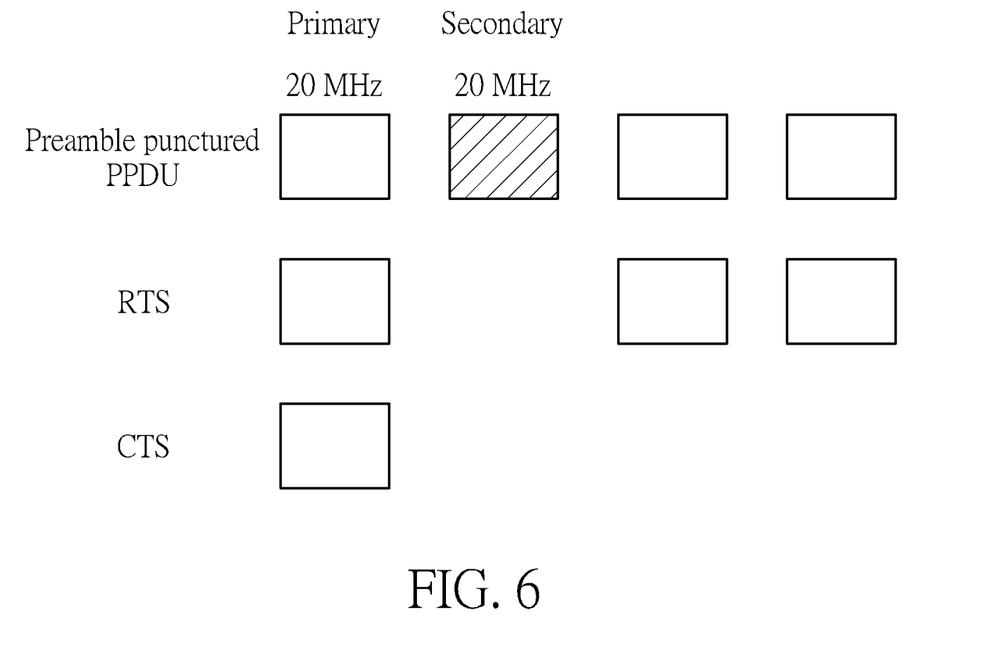
FIG. 6 is a diagram illustrating a fourth RTS/CTS scheme according to an embodiment of the present invention.

FIG. 6 is a diagram illustrating a fourth RTS/CTS scheme according to an embodiment of the present invention. Suppose that a preamble punctured PPDU will be transmitted in an 80 MHz channel with preamble puncturing, including a primary 20 MHZ channel, a secondary 20 MHz channel that is preamble punctured, and a secondary 40 MHz channel consisting of two contiguous 20 MHz channels. The control circuit 116 is arranged to set an RTS frame, and control the TX circuit 118 to transmit the RTS frame via channels excluding a preamble punctured channel (e.g., secondary 20 MHz channel as shown in FIG. 6). More specifically, the channels on which the RTS frame is sent include all channels of the preamble punctured PPDU that are not preamble punctured. In this embodiment, the wireless communication device 104 is not equipped with the capability of detecting a punctured bandwidth pattern (i.e., punctured RU allocation) of the RTS frame sent from the wireless communication device 102. The wireless communication device 104 generates a CTS frame in response to the RTS frame, where the CTS frame does not have a punctured bandwidth pattern (i.e., punctured RU allocation) the same as that of the RTS frame. Instead, the wireless communication device 104 transmits the CTS frame via detected continuous bandwidth only. Hence, the CTS frame has a modified RU allocation that is inconsistent with the punctured bandwidth pattern (i.e., punctured RU allocation) of the RTS frame, and includes the detected continuous bandwidth only. For example, the wireless communication device 104 transmits the CTS frame via a primary channel (e.g., primary 20 MHz channel shown in FIG. 6) only. Hence, the RX circuit 120 receives the CTS frame transmitted via the detected continuous bandwidth. However, if the RTS frame is an MU-RTS frame, the CTS bandwidth can be specified in the MU-RTS frame. To put it simply, the fourth RTS/CTS scheme employs an RTS frame with a punctured bandwidth pattern (i.e., punctured RU allocation) and a CTS frame with a continuous bandwidth pattern (i.e., modified RU allocation) to achieve protection of the bandwidth that is the same as that of the preamble punctured PPDU.

The main intent with the RTS/CTS mechanism is to reserve the channel and enhance the virtual carrier sense process. That is, the RTS/CTS mechanism makes all other non-AP STAs update their virtual carrier (i.e., NAVs) so that they can defer any transmission from the channel during that transmission opportunity (TXOP), and gets rid of the hidden node problem. The 802.11ax specification has a variant of the RTS, called MU-RTS. When the wireless communication device 102 is an AP, it can send the MU-RTS frame to multiple users (i.e., non-AP STAs, including wireless communication device 104), where the MU-RTS frame includes a Common Info field for all of the users and one User Info field for each of the users (i.e., non-AP STAs, including wireless communication device 104). After receiving the MU-RTS frame, each of the users (i.e., non-AP STAs, including wireless communication device 104) replies with one CTS frame to the AP (i.e., wireless communication device 102).

Regarding protection of the preamble punctured HE MU PPDU, the present invention further proposes rules for certain subfields in the preamble punctured MU-RTS frame. For example, a resource unit (RU) allocation subfield included in one User Info field for each of association identifiers (AIDs) of non-AP STAs and an uplink bandwidth (UL BW) subfield in the Common Info field should be set according to the clear channel assessment (CCA) status.

Figure 7:
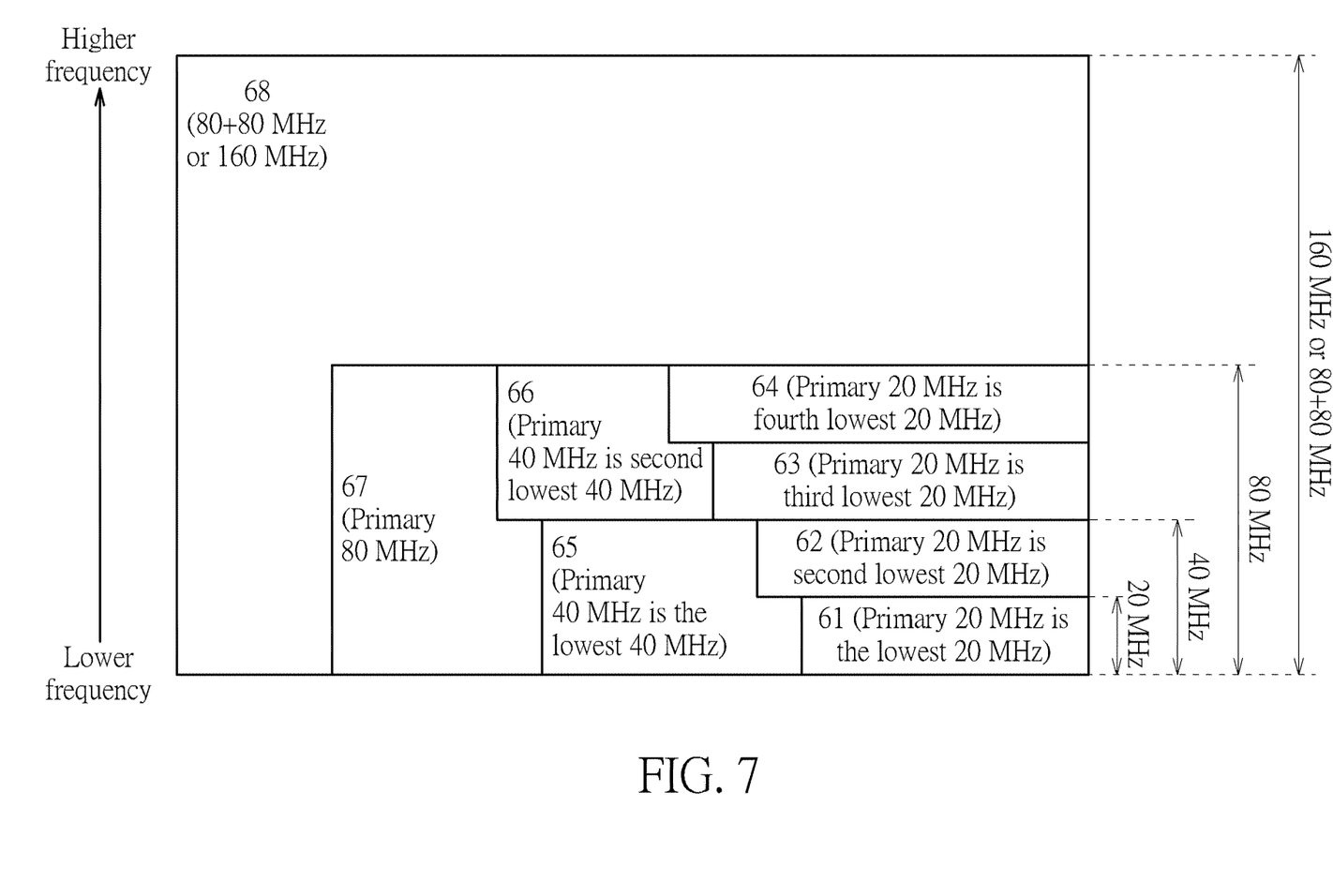
FIG. 7 is a diagram illustrating possible settings of an RU allocation subfield in an MU-RTS frame.

FIG. 7 is a diagram illustrating possible settings of an RU allocation subfield in an MU-RTS frame. The RU allocation subfield is set to indicate the primary 20 MHz channel as follows:
  61 if the primary 20 MHz channel is the only 20 MHz channel or the lowest frequency 20 MHz channel;
  62 if the primary 20 MHz channel is the second lowest frequency 20 MHz channel in the primary 40 MHz channel or primary 80 MHz channel;
  63 if the primary 20 MHz channel is the third lowest frequency 20 MHz channel in the primary 80 MHz channel; and
  64 if the primary 20 MHz channel is the fourth lowest frequency 20 MHz channel in the primary 80 MHz channel.

The RU allocation subfield is set to indicate the primary 40 MHz channel as follows:
  65 if the primary 40 MHz channel is the only 40 MHz channel or the lowest frequency 40 MHz channel in the primary 80 MHz channel; and
  66 if the primary 40 MHz channel is the second lowest frequency 40 MHz channel in the primary 80 MHz channel.

The RU allocation subfield is set to 67 to indicate the primary 80 MHz channel. The RU allocation subfield is set to 68 to indicate the primary and secondary 80 MHz channel.

The control circuit 116 applies constraints to the setting of the RU allocation subfield when a busy channel is treated as a preamble punctured channel. In one exemplary design, the RU allocation subfield is arranged to indicate which primary channel a CTS frame is sent on, and the control circuit 116 is arranged to set the RU allocation subfield through removing or modifying an original RU allocation subfield value indicative of a primary channel that overlaps the preamble punctured channel. For example, when the third lowest 20 MHz channel is preamble punctured, an original RU allocation value 67 in the MU-RTS frame is removed, or an original RU allocation value 67 in the MU-RTS frame is modified/reassigned by 65. For better comprehension, several examples are provided as below.

Figure 8:
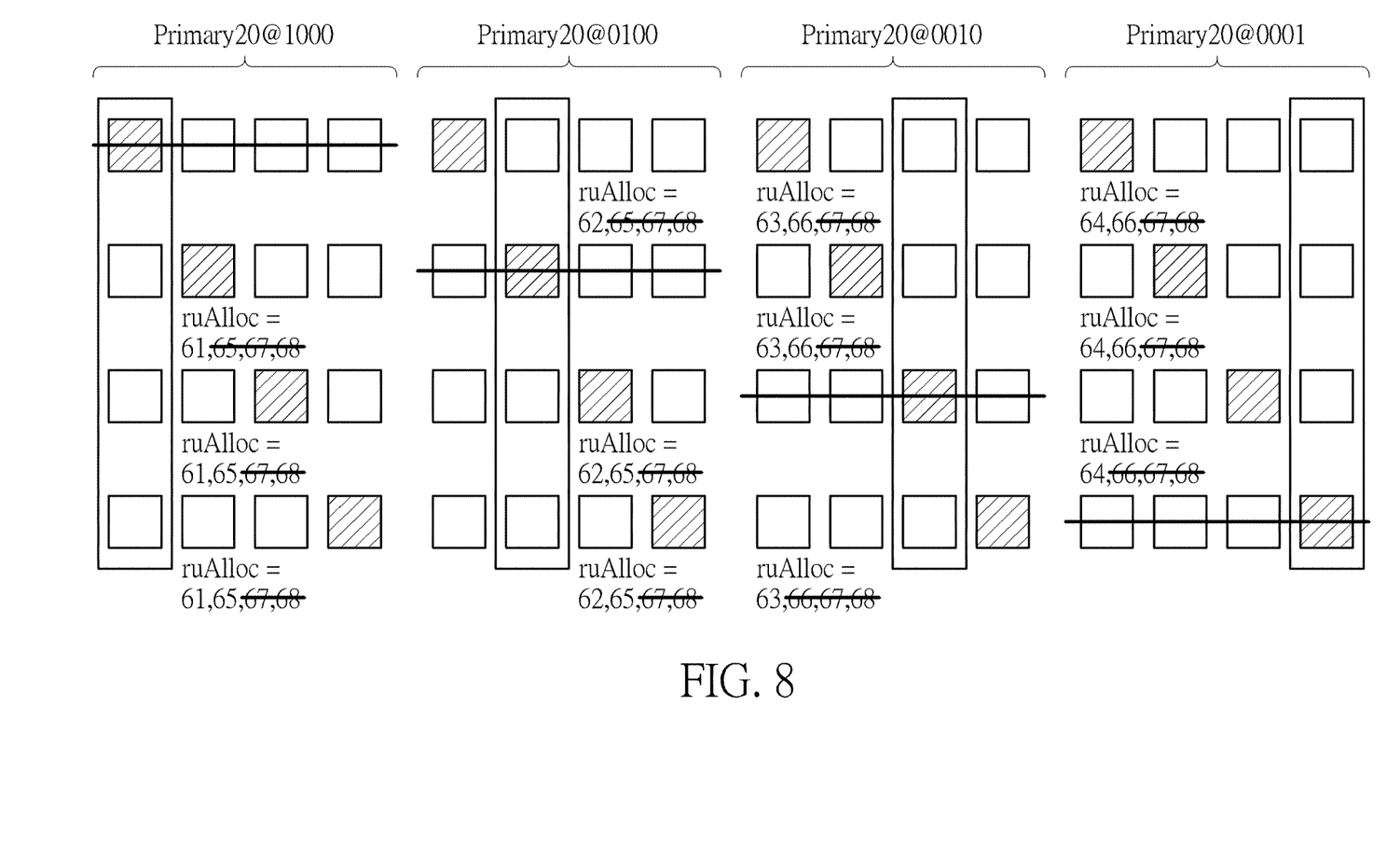
FIG. 8 is a diagram illustrating rules for an RU allocation subfield in a preamble punctured MU-RTS frame according to an embodiment of the present invention.

Please refer to FIG. 7 in conjunction with FIG. 8. FIG. 8 is a diagram illustrating rules for an RU allocation subfield (denoted by "ruAlloc") in a preamble punctured MU-RTS frame according to an embodiment of the present invention. Suppose that an 80 MHz HE MU PPDU with preamble puncturing will be transmitted. It should be noted that a primary channel is not allowed to be preamble punctured.

Regarding a first case where the primary 20 MHz channel is the lowest 20 MHz channel within the 80 MHz bandwidth, a primary channel that a CTS frame should be sent on is constrained to be a primary channel indicated by ruAlloc=61 (ruAlloc=65, 67, 68 is removed) when the second lowest 20 MHz channel is preamble punctured due to its channel state "CCA Busy", constrained to be a primary channel indicated by ruAlloc=61 or ruAlloc=65 (ruAlloc=67, 68 is removed) when the third lowest 20 MHz channel is preamble punctured due to its channel state "CCA Busy", and constrained to be a primary channel indicated by ruAlloc=61 or ruAlloc=65 (ruAlloc=67, 68 is removed) when the fourth lowest 20 MHz channel is preamble punctured due to its channel state "CCA Busy".

Regarding a second case where the primary 20 MHz channel is the second lowest 20 MHz channel within the 80 MHz bandwidth, a primary channel that a CTS frame should be sent on is constrained to be a primary channel indicated by ruAlloc=62 (ruAlloc=65, 67, 68 is removed) when the lowest 20 MHz channel is preamble punctured due to its channel state "CCA Busy", constrained to be a primary channel indicated by ruAlloc=62 or ruAlloc=65 (ruAlloc=67, 68 is removed) when the third lowest 20 MHz channel is preamble punctured due to its channel state "CCA Busy", and constrained to be a primary channel indicated by ruAlloc=62 or ruAlloc=65 (ruAlloc=67, 68 is removed) when the fourth lowest 20 MHz channel is preamble punctured due to its channel state "CCA Busy".

Regarding a third case where the primary 20 MHz channel is the third lowest 20 MHz channel within the 80 MHz bandwidth, a primary channel that a CTS frame should be sent on is constrained to be a primary channel indicated by ruAlloc=63 or ruAlloc=66 (ruAlloc=67, 68 is removed) when the lowest 20 MHz channel is preamble punctured due to its channel state "CCA Busy", constrained to be a primary channel indicated by ruAlloc=63 or ruAlloc=66 (ruAlloc=67, 68 is removed) when the second lowest 20 MHz channel is preamble punctured due to its channel state "CCA Busy", and constrained to be a primary channel indicated by ruAlloc=63 (ruAlloc=66, 67, 68 is removed) when the fourth lowest 20 MHz channel is preamble punctured due to its channel state "CCA Busy".

Regarding a fourth case where the primary 20 MHz channel is the fourth lowest 20 MHz channel within the 80 MHz bandwidth, a primary channel that a CTS frame should be sent on is constrained to be a primary channel indicated by ruAlloc=64 or ruAlloc=66 (ruAlloc=67, 68 is removed) when the lowest 20 MHz channel is preamble punctured due to its channel state "CCA Busy", constrained to be a primary channel indicated by ruAlloc=64 or ruAlloc=66 (ruAlloc=67, 68 is removed) when the second lowest 20 MHz channel is preamble punctured due to its channel state "CCA Busy", and constrained to be a primary channel indicated by ruAlloc=64 (ruAlloc=66, 67, 68 is removed) when the third lowest 20 MHz channel is preamble punctured due to its channel state "CCA Busy".

In addition, the control circuit 116 is further arranged to set the UL BW subfield to indicate a bandwidth of the preamble punctured MU-RTS frame (which is not transmitted using the preamble punctured channel). In this embodiment, the UL BW subfield may be set by a value indicative of "60 MHz". In other embodiments, the UL BW subfield may be set by a value indicative of a bandwidth that is different from any of "20 MHz", "40 MHz", "80 MHz", "80+80 MHz or 160 MHz" specified in the 802.11ax specification.

Figure 9:
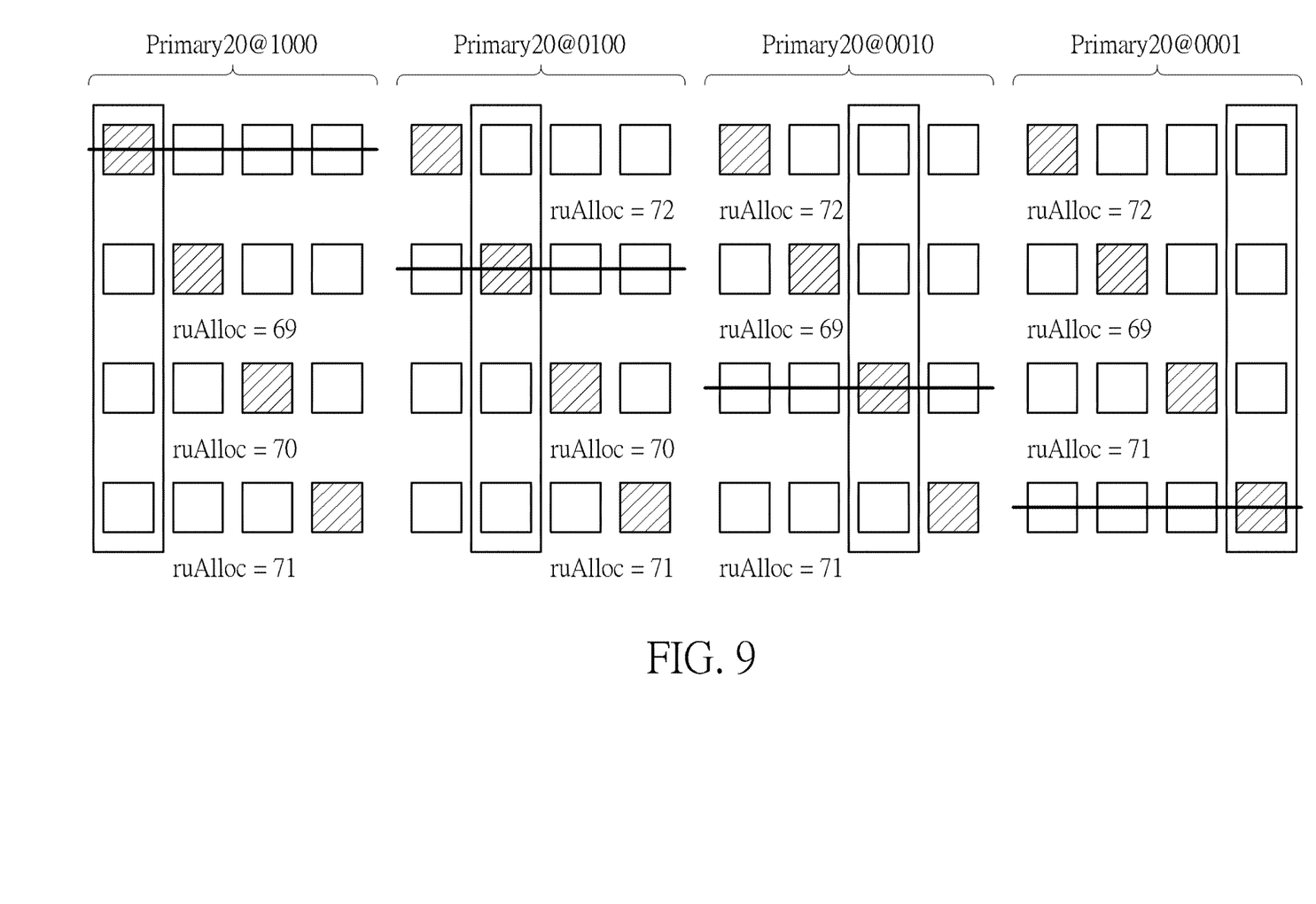
FIG. 9 is a diagram illustrating rules for an RU allocation subfield in a preamble punctured MU-RTS frame according to another embodiment of the present invention.

In another exemplary design, the control circuit 116 is arranged to set the RU allocation subfield to indicate a bandwidth pattern of a punctured RU on which a CTS frame is sent. Specifically, the RU allocation value carried by the RU allocation subfield is outside the range {61, 62, 63, 64, 65, 66, 67, 68}, for indicating a bandwidth pattern of a punctured RU on which a CTS frame should be sent. For example, the RU allocation value carried by the RU allocation subfield is selected from a range {69, 70, 71, 72}. Please refer to FIG. 7 in conjunction with FIG. 9. FIG. 9 is a diagram illustrating rules for an RU allocation subfield (denoted by "ruAlloc") in a preamble punctured MU-RTS frame according to another embodiment of the present invention. Suppose that an 80 MHz HE MU PPDU with preamble puncturing will be transmitted. It should be noted that a primary channel is not allowed to be preamble punctured.

Regarding a first case where the primary 20 MHz channel is the lowest 20 MHz channel within the 80 MHz bandwidth, a bandwidth pattern of a punctured RU that a CTS frame should be sent on is indicated by ruAlloc=69 when the second lowest 20 MHz channel is preamble punctured due to its channel state "CCA Busy", indicated by ruAlloc=70 when the third lowest 20 MHz channel is preamble punctured due to its channel state "CCA Busy", and indicated by ruAlloc=71 when the fourth lowest 20 MHz channel is preamble punctured due to its channel state "CCA Busy".

Regarding a second case where the primary 20 MHz channel is the second lowest 20 MHz channel within the 80 MHz bandwidth, a bandwidth pattern of a punctured RU that a CTS frame should be sent on is indicated by ruAlloc=72 when the lowest 20 MHz channel is preamble punctured due to its channel state "CCA Busy", indicated by ruAlloc=70 when the third lowest 20 MHz channel is preamble punctured due to its channel state "CCA Busy", and indicated by ruAlloc=71 when the fourth lowest 20 MHz channel is preamble punctured due to its channel state "CCA Busy".

Regarding a third case where the primary 20 MHz channel is the third lowest 20 MHz channel within the 80 MHz bandwidth, a bandwidth pattern of a punctured RU that a CTS frame should be sent on is indicated by ruAlloc=72 when the lowest 20 MHz channel is preamble punctured due to its channel state "CCA Busy", indicated by ruAlloc=69 when the second lowest 20 MHz channel is preamble punctured due to its channel state "CCA Busy", and indicated by ruAlloc=71 when the fourth lowest 20 MHz channel is preamble punctured due to its channel state "CCA Busy".

Regarding a fourth case where the primary 20 MHz channel is the fourth lowest 20 MHz channel within the 80 MHz bandwidth, a bandwidth pattern of a punctured RU that a CTS frame should be sent on is indicated by ruAlloc=72 when the lowest 20 MHz channel is preamble punctured due to its channel state "CCA Busy", indicated by ruAlloc=69 when the second lowest 20 MHz channel is preamble punctured due to its channel state "CCA Busy", and indicated by ruAlloc=71 when the third lowest 20 MHz channel is preamble punctured due to its channel state "CCA Busy".

In addition, the control circuit 116 is further arranged to set the UL BW subfield to indicate a bandwidth of the preamble punctured MU-RTS frame (which is not transmitted using the preamble punctured channel). In this embodiment, the UL BW subfield may be set by a value indicative of "60 MHz". In other embodiments, the UL BW subfield may be set by a value indicative of a bandwidth that is different from any of "20 MHz", "40 MHz", "80 MHz", "80+80 MHz or 160 MHz" specified in the 802.11ax specification.

In addition to setting an MU-RTS frame to be transmitted with preamble puncturing, the control circuit 116 is capable of setting an MU-RTS frame to be transmitted via a primary channel only. In response to an RU allocation subfield setting in a User Info field for an AID assigned to a non-AP STA, the non-AP STA may reply a CTS frame to an AP via a primary channel only. The primary channel used for CTS frame transmission may be the same as or different from the primary channel used for RTS frame transmission. Similarly, the control circuit 116 is arranged to set the RU allocation subfield to ensure that a primary channel indicated by the RU allocation subfield does not overlap the preamble punctured channel.

Figure 10:
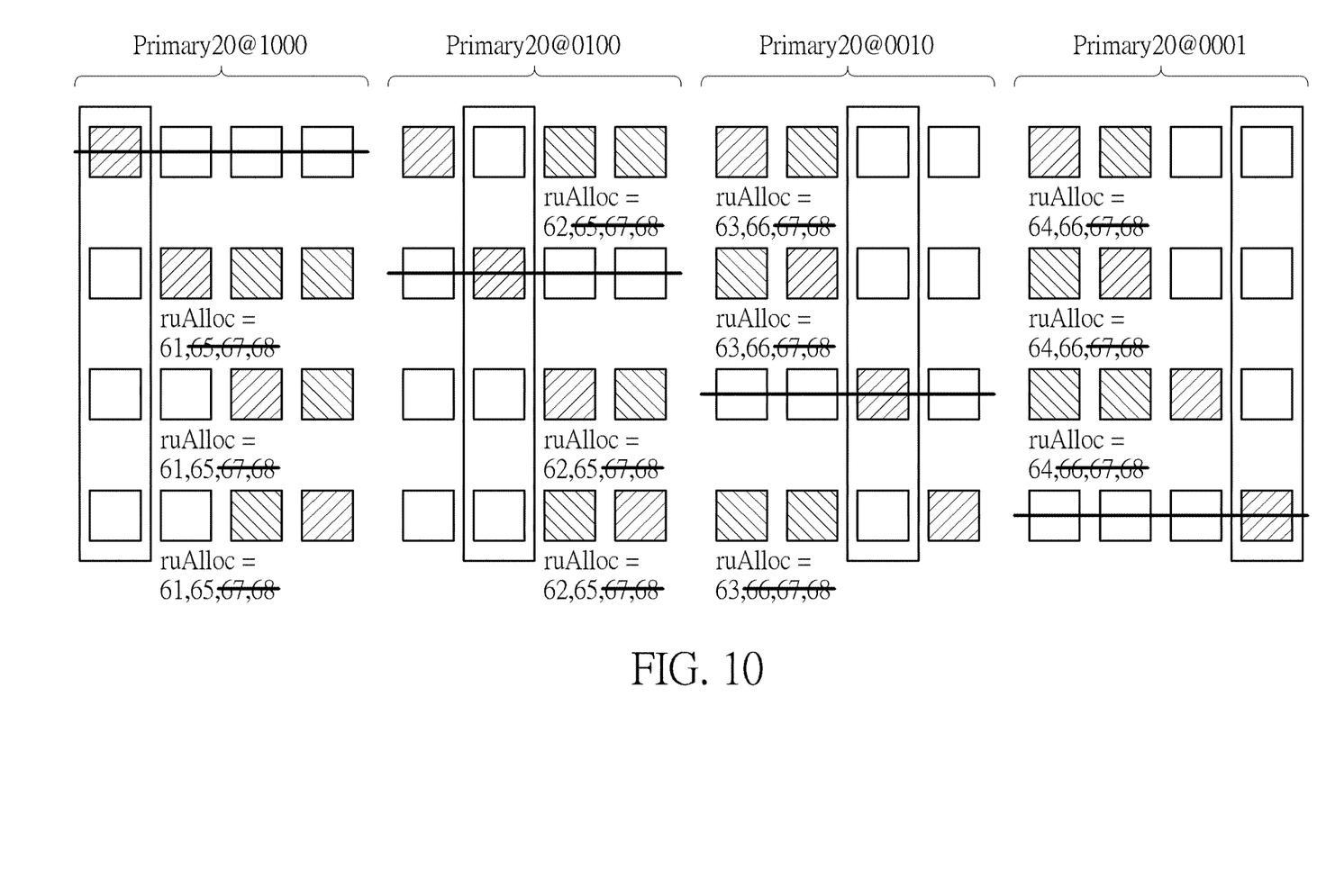
FIG. 10 is a diagram illustrating rules for an RU allocation subfield in a preamble punctured MU-RTS frame according to yet another embodiment of the present invention.

Please refer to FIG. 7 in conjunction with FIG. 10. FIG. 10 is a diagram illustrating rules for an RU allocation subfield (denoted by "ruAlloc") in a preamble punctured MU-RTS frame according to yet another embodiment of the present invention. Suppose that an 80 MHz HE MU PPDU with preamble puncturing will be transmitted. It should be noted that a primary channel is not allowed to be preamble punctured.

Regarding a first case where the primary 20 MHz channel used by AP to send the MU-RTS frame is the lowest 20 MHz channel within the 80 MHz bandwidth, a primary channel that a CTS frame should be sent on is constrained to be a primary channel indicated by ruAlloc=61 (ruAlloc=65, 67, 68 is removed) when the second lowest 20 MHz channel is preamble punctured due to its channel state "CCA Busy", constrained to be a primary channel indicated by ruAlloc=61 or ruAlloc=65 (ruAlloc=67, 68 is removed) when the third lowest 20 MHz channel is preamble punctured due to its channel state "CCA Busy", and constrained to be a primary channel indicated by ruAlloc=61 or ruAlloc=65 (ruAlloc=67, 68 is removed) when the fourth lowest 20 MHz channel is preamble punctured due to its channel state "CCA Busy".

Regarding a second case where the primary 20 MHz channel used by AP to send the MU-RTS frame is the second lowest 20 MHz channel within the 80 MHz bandwidth, a primary channel that a CTS frame should be sent on is constrained to be a primary channel indicated by ruAlloc=62 (ruAlloc=65, 67, 68 is removed) when the lowest 20 MHz channel is preamble punctured due to its channel state "CCA Busy", constrained to be a primary channel indicated by ruAlloc=62 or ruAlloc=65 (ruAlloc=67, 68 is removed) when the third lowest 20 MHz channel is preamble punctured due to its channel state "CCA Busy", and is constrained to be a primary channel indicated by ruAlloc=62 or ruAlloc=65 (ruAlloc=67, 68 is removed) when the fourth lowest 20 MHz channel is preamble punctured due to its channel state "CCA Busy".

Regarding a third case where the primary 20 MHz channel used by AP to send the MU-RTS frame is the third lowest 20 MHz channel within the 80 MHz bandwidth, a primary channel that a CTS frame should be sent on is constrained to be a primary channel indicated by ruAlloc=63 or ruAlloc=66 (ruAlloc=67, 68 is removed) when the lowest 20 MHz channel is preamble punctured due to its channel state "CCA Busy", constrained to be a primary channel indicated by ruAlloc=63 or ruAlloc=66 (ruAlloc=67, 68 is removed) when the second lowest 20 MHz channel is preamble punctured due to its channel state "CCA Busy", and constrained to be a primary channel indicated by ruAlloc=63 (ruAlloc=66, 67, 68 is removed) when the fourth lowest 20 MHz channel is preamble punctured due to its channel state "CCA Busy".

Regarding a fourth case where the primary 20 MHz channel used by AP to send the MU-RTS frame is the fourth lowest 20 MHz channel within the 80 MHz bandwidth, a primary channel that a CTS frame should be sent on is constrained to be a primary channel indicated by ruAlloc=64 or ruAlloc=66 (ruAlloc=67, 68 is removed) when the lowest 20 MHz channel is preamble punctured due to its channel state "CCA Busy", constrained to be a primary channel indicated by ruAlloc=64 or ruAlloc=66 (ruAlloc=67, 68 is removed) when the second lowest 20 MHz channel is preamble punctured due to its channel state "CCA Busy", and constrained to be a primary channel indicated by ruAlloc=64 (ruAlloc=66, 67, 68 is removed) when the third lowest 20 MHz channel is preamble punctured due to its channel state "CCA Busy".

In addition, the control circuit 116 is further arranged to set the UL BW subfield to indicate a bandwidth of the preamble punctured MU-RTS frame (which is not transmitted using the preamble punctured channel). In this embodiment, the UL BW subfield may be set by a value indicative of "20 MHz" specified in the 802.11ax specification. In other embodiments, the UL BW subfield may be set by a value indicative of "40 MHz", "80 MHz", or "80+80 MHz or 160 MHz" specified in the 802.11ax specification.

In above embodiments, the proposed RTS/CTS scheme is illustrated under a scenario that a preamble punctured PPDU (e.g., preamble punctured HE SU PPDU or preamble punctured HE MU PPDU) is transmitted using an 80 MHz channel with preamble puncturing. However, the same concept of the proposed RTS/CTS scheme can be extended to another scenario that a preamble punctured PPDU (e.g., preamble punctured HE SU PPDU or preamble punctured HE MU PPDU) is transmitted using an 80+80 MHz channel (or 160 MHz channel) with preamble puncturing. Similar description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, comprising:
   a transmitter circuit;
   a control circuit, arranged to set a request to send (RTS) frame, and control the transmitter circuit to transmit the RTS frame via at least one channel excluding a preamble punctured channel, wherein said at least one channel comprises all channels of a preamble punctured physical layer protocol data unit (PPDU) that are not preamble punctured; and
   a receiver circuit, arranged to receive a clear to send (CTS) frame sent in response to the RTS frame, where the CTS frame has a punctured resource unit (RU) allocation, and is transmitted via channels that are the same as all channels of the preamble punctured PPDU that are not preamble punctured.

2. A wireless communication device, comprising:
a transmitter circuit;
a control circuit, arranged to set a request to send (RTS) frame, and control the transmitter circuit to transmit the RTS frame via at least one channel excluding a preamble punctured channel, wherein said at least one channel comprises all channels of a preamble punctured physical layer protocol data unit (PPDU) that are not preamble punctured; and
a receiver circuit, arranged to receive a clear to send (CTS) frame sent in response to the RTS frame, where the CTS frame is transmitted with a modified resource unit (RU) allocation that includes a continuous bandwidth only.

3. A wireless communication device, comprising:
a transmitter circuit; and
a control circuit, arranged to set a multi-user request to send (MU-RTS) frame, and control the transmitter circuit to transmit the MU-RTS frame via at least one channel excluding a preamble punctured channel;
wherein the MU-RTS frame comprises a resource unit (RU) allocation subfield arranged to indicate which primary channel a clear to send (CTS) frame is sent on, and the control circuit is arranged to set the RU allocation subfield through removing or modifying an original RU allocation subfield value indicative of a primary channel that overlaps the preamble punctured channel; or
wherein the MU-RTS frame comprises a resource unit (RU) allocation subfield, and the control circuit is arranged to set the RU allocation subfield to indicate a bandwidth pattern of a punctured RU on which a clear to send (CTS) frame is sent; or
wherein the MU-RTS frame comprises an uplink bandwidth (UL BW) subfield, and the control circuit is arranged to set the UL BW subfield to indicate a bandwidth of the MU-RTS frame that is not transmitted using the preamble punctured channel.

4. A wireless communication method, comprising:
setting a request to send (RTS) frame;
transmitting, by a transmitter circuit, the RTS frame via at least one channel excluding a preamble punctured channel, wherein said at least one channel comprises all channels of a preamble punctured physical layer protocol data unit (PPDU) that are not preamble punctured; and
receiving a clear to send (CTS) frame sent in response to the RTS frame, where the CTS frame has a punctured resource unit (RU) allocation, and is transmitted via channels that are the same as all channels of the preamble punctured PPDU that are not preamble punctured.

5. A wireless communication method, comprising:
setting a request to send (RTS) frame;
transmitting, by a transmitter circuit, the RTS frame via at least one channel excluding a preamble punctured channel, wherein said at least one channel comprises all channels of a preamble punctured physical layer protocol data unit (PPDU) that are not preamble punctured; and
receiving a clear to send (CTS) frame sent in response to the RTS frame, where the CTS frame is transmitted with a modified resource unit (RU) allocation that includes a continuous bandwidth only.

6. A wireless communication method, comprising:
setting a multi-user request to send (MU-RTS) frame; and
transmitting, by a transmitter circuit, the MU-RTS frame via at least one channel excluding a preamble punctured channel;
wherein the MU-RTS frame comprises a resource unit (RU) allocation subfield arranged to indicate which primary channel a clear to send (CTS) frame is sent on, and setting the RTS frame comprises;
setting the RU allocation subfield through removing or modifying an original RU allocation subfield value indicative of a primary channel that overlaps the preamble punctured channel; or
wherein the MU-RTS frame comprises a resource unit (RU) allocation subfield, and setting the RTS frame comprises:
setting the RU allocation subfield to indicate a bandwidth pattern of a punctured RU on which a clear to send (CTS) frame is sent; or
wherein the MU-RTS frame comprises an uplink bandwidth (UL BW) subfield, and setting the RTS frame comprises:
setting the UL BW subfield to indicate a bandwidth of the MU-RTS frame that is not transmitted using the preamble punctured channel.

7. A wireless communication device, comprising:
a transmitter circuit;
a control circuit, arranged to set a request to send (RTS) frame, and control the transmitter circuit to transmit the RTS frame via a plurality of channels including a preamble punctured channel; and
a receiver circuit, arranged to receive a clear to send (CTS) frame sent in response to the RTS frame, wherein the CTS frame is transmitted via the plurality of channels including the preamble punctured channel.

8. The wireless communication device of claim 7, wherein the plurality of channels comprise the preamble punctured channel and all channels of a preamble punctured physical layer protocol data unit (PPDU) that are not preamble punctured.

* * * * *